Feb. 13, 1951   G. J. OESTREICHER   2,541,715
STOP VALVE
Filed Feb. 15, 1945

INVENTOR.
GEORGE J. OESTREICHER
BY
Bates, Teare & McBean
ATTORNEYS

Patented Feb. 13, 1951

2,541,715

UNITED STATES PATENT OFFICE 2,541,715

STOP VALVE

George J. Oestreicher, Cleveland, Ohio; Gertrude E. Oestreicher, executrix of said George J. Oestreicher, deceased, assignor to Gertrude E. Oestreicher, Cleveland, Ohio Application February 15, 1945, Serial No. 577,979

3 Claims. (Cl. 251—97)

This invention relates to stop valves having rotatable plugs, more particularly such a valve having a body to be attached to conduits and a tapered plug having an opening through it adapted to effect communication between such conduits or prevent such communication according to the position of the plug. The object of the invention is to provide simple and effective means for releasing the plug slightly from its seat preliminary to its being turned to enable it to be readily turned manually.

My stop valve is adapted for use, for example, on sanitary pipe lines such as employed in dairies, breweries, and the like, where the valve must be of considerable size and hence with the plug tightly seated would require considerable force to turn the plug.

My invention is an improvement of the stop valve shown in my prior Patent No. 2,187,477, granted to me January 16, 1940. Unlike the structure shown in that patent, the valve of the present invention is provided with a spring to maintain the tapered plug normally seated in the conical cavity in the valve wall, and is provided with means for moving the plug axially against the resistance of such springs to free its tight engagement with the valve body, it being an object of the invention to provide such means in a very simple and readily operable form.

A further object of the invention is to provide a suitable anti-friction between the plug-freeing mechanism and the plug, whereby the plug may be readily turned notwithstanding a shoulder thereon is abutted to withdraw the plug from its seat.

My invention is hereinafter more fully explained in connection with the accompanying drawings and the essential novel features are summarized in the claims.

Figures 1, 2:
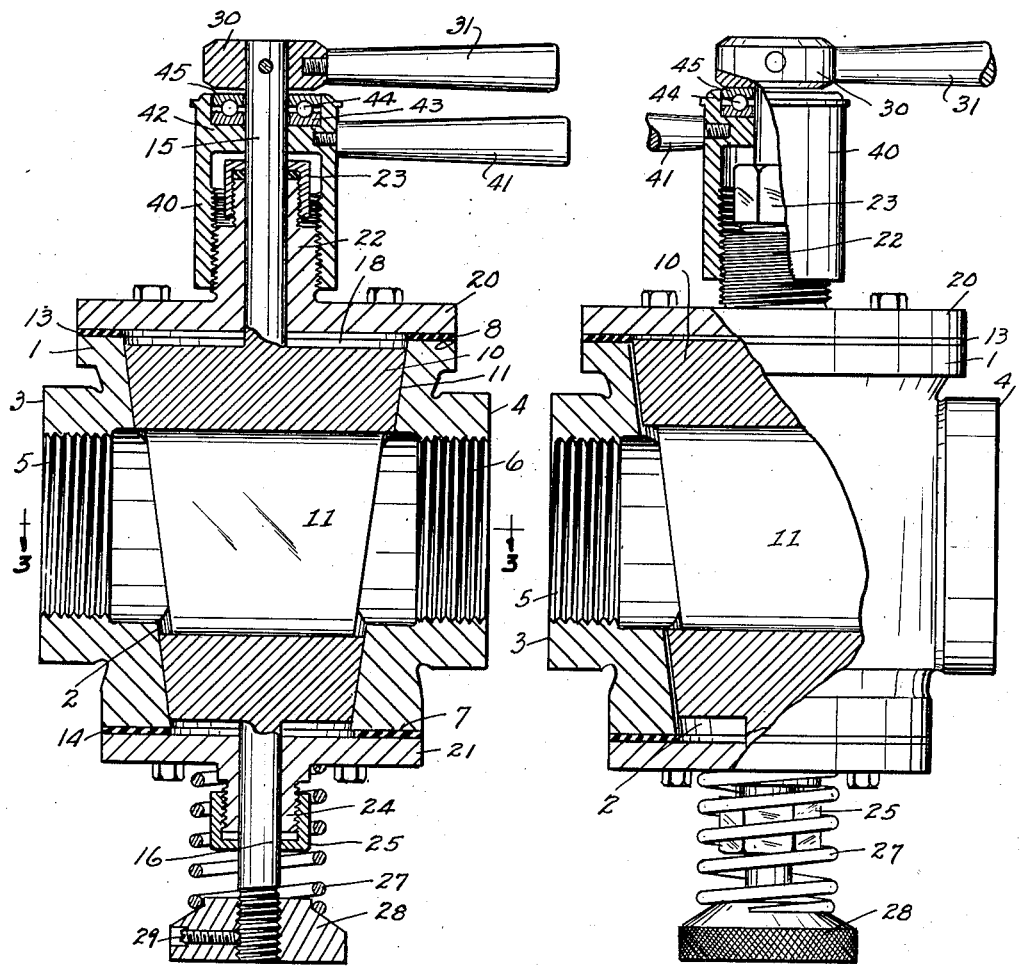
Figure 3:
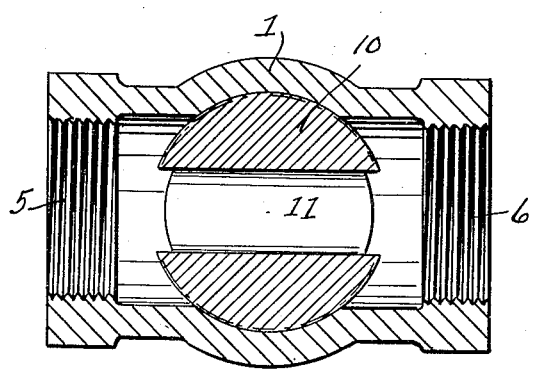

In the drawings, Fig. 1 is an axial section through my stop valve, with the plug seated and in position to effect communication between the conduits; Fig. 2 is a side elevation, partly broken away, of the valve with the plug raised slightly to enable its ready turning, the amount of clearance between the plug and body being exaggerated in this view for clearness of illustration; Fig. 3 is a cross section of the valve body and plug in a plane indicated by the line 3—3 on Fig. 1.

Referring to the drawing, the valve comprises a hollow body 1 having a central tapered axial bore 2 opening through the upper and lower ends of the body 1. The body has attachment portions 3 and 4 having passages 5 and 6, respectively, one of which passages comprises an inlet passage to the central bore, and the other of which comprises an outlet passage.

At its lower end, the body 1 has a flat, annular shoulder portion 7, and a corresponding shoulder 8 is provided at the upper end of the body. Mounted within the body in the central bore 2 is a valve plug 10 having a diametral passage 11 therethrough which is arranged to connect with the passages 5 and 6 in one rotated position of the plug 10. The plug 10 is tapered from its upper or head end toward its lower or tail end, so as to fit in sealing relation with the wall of the bore 2.

Secured to the upper and lower ends of the valve body are plates 20 and 21, there being interposed gaskets 13 and 14. These end plates surround axial stems 15 and 16 extending upwardly and downwardly from the plug. An extension 22 on the top plate 20 carries a packing gland 23 embracing the stem 15, and an extension 24 on the plate 21 carries a packing gland 25 embracing the stem 16.

Surrounding the lower stem 16 is a helical compression spring 27 compressed between the underside of the plate 21 and a nut 28 screwed onto the end of the stem 16 and preferably locked by a set screw 29. This construction tends to maintain the tapered plug snugly on its seat.

Secured to the upper end of the upper stem 15 of the plug by a hub 30 is a handle 31 by which the plug may be manually rotated to connect or interrupt the passages 5 and 6.

Threaded on the extension 22 of the top plate 20 is a sleeve 40 having an operating handle 41. This sleeve has an intermediately located partition 42 leaving a recess above it, and in this recess is mounted a ball bearing. As shown, this bearing comprises a lower washer 43 having an annular groove in its upper face, an annular row of balls 44 resting in said groove, and an upper washer 45 having an annular groove on its underface engaging said row of balls.

When the plug is seated, there is clearance between its upper end and the underface of the plate 20, as shown at 18 in Fig. 1, and this clearance allows the plug to be moved upward slightly, as shown in exaggerated form in Fig. 2, to cause its tapered surface to become free from the tapered seat of the valve body.

The upward movement of the valve plug to free it from the body is readily effected by turning the handle 41 in the direction to cause the sleeve 40 to rise, so that the ball bearing carried thereby abuts the underface of the hub 30 of the handle 31. After such engagement further turning of the handle 41 bodily lifts the plug thus freeing it from its seat. Thereafter the plug may be readily turned by the handle 31. The ball bearing between the lifting collar 40 and the plug handle allows such handle to turn the plug very readily notwithstanding the pressure exerted on the handle hub. As soon as the plug has been given its new position by the handle 31 the movement of the handle 41 in the direction to lower the screw-threaded sleeve 40 enables the spring 27 to re-seat the plug.

Shut-off valves having tapered plugs normally maintained on their seats by external compression springs have been in use for a long time and are effective to maintain the plug tightly on its seat, which is of special importance when the plug is in the closing position. My mechanism for moving such plug axially a slight distance enables a plug to be readily turned notwithstanding the spring has sufficient force to maintain it normally very tightly on its seat. In valves that are frequently used in the oil fields, gasoline industry, or for liquid or steam where high pressure valves are required, the spring retention of the plug on its seat frequently makes it difficult to turn the plug. My mechanism, however, frees the plug from the seat with a minimum of friction between the parts which effect the freeing action, so that the plug may be turned with very little effort.

I claim:

1. A stop valve comprising a hollow body having an internal seat and passageways leading thereto, a plug adapted to be mounted on said seat and having a passageway adapted to connect the passageways of the body or prevent communication according to the position of the plug, said body having flat surfaces at the opposite ends of its seat, a pair of end plates secured to the respective ends of the body and each having an outward extension carrying a packing gland, the plug having stems extending from its opposite ends through the respective packing glands, a spring surrounding one of the stems and compressed between an abutment thereon and the outer surface of the adjacent end plate, a lever on the other stem and means on the extension adapted to abut the lever to withdraw the plug from its seat.

2. A valve of the character described comprising a body having a tapered seat and passageways leading to and from the seat, said body having a flat top and bottom, a tapered plug adapted to occupy the seat and having stems extending upwardly and downwardly from its opposite ends, a plate secured to the top of the body and having a tubular extension surrounding the upwardly extending stem, a plate secured to the bottom of the body having a tubular extension surrounding the downwardly extending stem, packing glands carried by the tubular extensions, a helical compression spring surrounding the downwardly extending stem and compressed between the cap at that end and a nut at that stem, a sleeve threaded on the extension of the plate at the top of the valve body, a ball bearing mounted in the upper portion of the sleeve and surrounding the stem, a hand lever having a hub secured to the latter stem above the ball bearing, and a hand lever secured to said sleeve whereby it may be rotated to shove the bearing against the hub of the stem lever to withdraw the plug from its seat.

3. A stop valve having, in combination a tapered internal seat and passageways leading thereto, a tapered plug associated with said seat and having a passageway adapted to connect the passageways of the valve or prevent communication according to the position of the plug, said plug having stems extending upwardly and downwardly from its opposite ends, closures at the opposite ends of the valve chamber each having a tubular extension surrounding one of the stems and carrying packing glands thereon, a helical compression spring surrounding one of the tubular extensions and positioned between the closure at that end and a nut on that stem to maintain the plug seated, a hand lever having a hub secured to the opposite stem, and a hand lever movably mounted on the tubular extension of the other closure, and carrying anti-friction bearings adjacent said hub, means for causing an axial movement of the last mentioned lever consequent upon its rotation, whereby the rotation of the last-named lever may lift the plug axially of its seat and the rotation of the first-named lever may rotate the plug with respect to said seat.

GEORGE J. OESTREICHER.

REFERENCES CITED

The following references are of record in the file of this patent:

UNITED STATES PATENTS

| Number | Name | Date |
|---|---|---|
| Re. 3,152 | Davis | Oct. 6, 1868 |
| 632,934 | Ashley | Sept. 12, 1899 |
| 859,573 | McMillan | July 9, 1907 |
| 924,270 | Paterson | June 8, 1909 |
| 1,891,759 | Flodin | Dec. 20, 1932 |
| 2,060,388 | Whittle | Nov. 10, 1936 |
| 2,147,851 | Mallon | Feb. 21, 1939 |
| 2,187,477 | Oestreicher | Jan. 16, 1940 |
| 2,345,073 | Rosett | Mar. 28, 1944 |
| 2,419,647 | Jacobsen | Apr. 29, 1947 |
| 2,421,969 | Shelly | June 10, 1947 |

FOREIGN PATENTS

| Number | Country | Date |
|---|---|---|
| 670,524 | France | Aug. 19, 1929 |
| 804,885 | France | Aug. 10, 1936 |